US012791418B2

(12) United States Patent
Hu et al.

(10) Patent No.: US 12,791,418 B2
(45) Date of Patent: Nov. 10, 2026

(54) LIQUID LEAKAGE DETECTION APPARATUS AND METHOD, AND COMPUTER DEVICE

(71) Applicant: Huawei Technologies Co., Ltd., Shenzhen (CN)

(72) Inventors: Hongjun Hu, Shenzhen (CN); Jun'en Gao, Dongguan (CN); Xiaoguang Sun, Dongguan (CN); Xing Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/623,448

(22) Filed: Apr. 1, 2024

(65) Prior Publication Data

US 2024/0247996 A1 Jul. 25, 2024

Related U.S. Application Data

(63) Continuation of application No. PCT/CN2022/096592, filed on Jun. 1, 2022.

(30) Foreign Application Priority Data

Sep. 30, 2021 (CN) .......................... 202111166698.0

(51) Int. Cl.
*G01M 3/18* (2006.01)

(52) U.S. Cl.
CPC .................................... *G01M 3/18* (2013.01)

(58) Field of Classification Search
CPC ............ G01M 3/00; G01M 3/04; G01M 3/16; G01M 3/18
See application file for complete search history.

(56) References Cited

U.S. PATENT DOCUMENTS

| | | | | |
|---|---|---|---|---|
| 5,537,291 | A * | 7/1996 | Onodera | H10W 40/47 257/E23.098 |
| 10,565,848 | B2 * | 2/2020 | Davis | G01M 3/16 |
| 2002/0160085 | A1 * | 10/2002 | Tokita | B65D 81/264 426/124 |
| 2004/0188069 | A1 * | 9/2004 | Tomioka | G06F 1/203 257/E23.098 |
| 2023/0061298 | A1 * | 3/2023 | Gao | G01M 3/38 |
| 2023/0067321 | A1 * | 3/2023 | Gao | H05K 7/20272 |
| 2025/0234484 | A1 * | 7/2025 | Gao | H05K 7/20272 |

* cited by examiner

*Primary Examiner* — Nguyen Q. Ha
(74) *Attorney, Agent, or Firm* — Conley Rose, P.C.

(57) ABSTRACT

A liquid leakage detection apparatus configured for liquid leakage detection of a liquid cooling apparatus of a printed circuit board, wherein the liquid leakage detection apparatus includes a sleeve, a first liquid cooling pipe, a liquid cooling plate, flow guiding apparatuses, and a liquid leakage detection circuit. The sleeve wraps the first liquid cooling pipe, the first liquid cooling pipe is coupled to the liquid cooling plate, the liquid cooling plate and the first liquid cooling pipe are configured to dissipate heat for an electronic element using a filled coolant, the flow guiding apparatuses are coupled to an edge of the liquid cooling plate, the other ends of the flow guiding apparatuses are coupled to the liquid leakage detection circuit.

20 Claims, 5 Drawing Sheets

LIQUID LEAKAGE DETECTION APPARATUS AND METHOD, AND COMPUTER DEVICE

CROSS-REFERENCE TO RELATED APPLICATIONS

This is a continuation of International Patent Application No. PCT/CN2022/096592 filed on Jun. 1, 2022, which claims priority to Chinese Patent Application No. 20/2111166698.0 filed on Sep. 30, 2021. The disclosures of the aforementioned applications are hereby incorporated by reference in their entireties.

TECHNICAL FIELD

This disclosure relates to the field of computer technologies, and in particular, to a liquid leakage detection apparatus and method, and a computer device.

BACKGROUND

Popularity of technologies such as cloud computing, big data, and artificial intelligence (AI) promotes emergence of high-density computing. With continuous improvement of server performance, power consumption of a server also increases greatly. Therefore, a liquid cooling technology gradually becomes a main method for device heat dissipation of a high-density and high-performance server.

A liquid cooling pipe filled with a coolant is disposed in a server that uses the liquid cooling technology for heat dissipation. A pump connected to the liquid cooling pipe enables the coolant in the liquid cooling pipe to circulate in the liquid cooling pipe, and heat generated by a device in the server is conducted to the coolant. Then, a refrigerating apparatus connected to the liquid cooling pipe cools the coolant, thereby completing heat dissipation of the device in the server. However, in the foregoing solution, an aging problem occurs in the liquid cooling pipe as a service life increases, a leakage problem of the coolant exists in the liquid cooling pipe, and a device fault is caused when the leaked coolant drips on the device. In the current technology, a water detection cable sensor is usually used to detect whether liquid leakage occurs in the liquid cooling pipe. Further, the water detection cable sensor is wound around the outside of the liquid cooling pipe. When the coolant leaks, the water detection cable sensor may send an alarm. However, a solution in which the water detection cable sensor is used can only detect a liquid leakage problem, and the problem that a device fault is caused when the leaked coolant drips on a device surface still exists. Therefore, how to provide a more secure liquid leakage detection method becomes a technical problem to be urgently resolved.

SUMMARY

This disclosure provides a liquid leakage detection apparatus and method, and a computer device, to detect that a liquid cooling apparatus leaks before leaked liquid of the liquid cooling apparatus overflows to an electronic element, thereby improving security of the electronic element.

To achieve the foregoing objective, this disclosure provides the following technical solutions.

According to a first aspect, a liquid leakage detection apparatus is provided, where the apparatus may include a first liquid cooling pipe, a liquid cooling plate, flow guiding apparatuses, a sleeve, and a liquid leakage detection circuit. The sleeve is wrapped outside the first liquid cooling pipe, the first liquid cooling pipe is connected to the liquid cooling plate on which a second liquid cooling pipe is disposed, and the second liquid cooling pipe is a liquid cooling pipe disposed on the liquid cooling plate to enable a coolant to pass through. The flow guiding apparatuses are connected to an edge of the liquid cooling plate, and the other end of the flow guiding apparatus is connected to the liquid leakage detection circuit. The liquid cooling plate and the first liquid cooling pipe are configured to cool an electronic element, when first leaked liquid occurs in the first liquid cooling pipe and/or second leaked liquid occurs in the liquid cooling plate, the first leaked liquid and/or the second leaked liquid flow to the liquid leakage detection circuit through the flow guiding apparatuses, and the liquid leakage detection circuit is conducted. Before the first leaked liquid and/or the second leaked liquid overflow to the electronic element, the flow guiding apparatuses guide the leaked liquid to the liquid leakage detection circuit, so that the liquid leakage detection circuit learns that the liquid leakage detection apparatus leaks. In this disclosure, a method for wrapping the first liquid cooling pipe by using the sleeve is used to ensure that, when the first leaked liquid and/or the second leaked liquid occur, the flow guiding apparatuses guide the leaked liquid to the liquid leakage detection circuit, the liquid leakage detection circuit is conducted by the first leaked liquid and/or the second leaked liquid, and the liquid leakage detection circuit learns that the liquid cooling apparatus leaks. Therefore, the liquid leakage detection circuit finds that the liquid cooling apparatus leaks before the leaked liquid is in contact with the electronic element, thereby improving security of this solution.

In a possible implementation, the flow guiding apparatuses include a first flow guiding apparatus, where the first flow guiding apparatus is located below a joint between the first liquid cooling pipe and the liquid cooling plate, the other end of the first flow guiding apparatus is connected to the liquid leakage detection circuit, and the first flow guiding apparatus is configured to guide the first leaked liquid to the liquid leakage detection circuit. In this solution, the first flow guiding apparatus is used to hold the first leaked liquid and guide the first leaked liquid to the liquid leakage detection circuit, thereby improving implementability of this solution.

In another possible implementation, the liquid cooling plate is a liquid cooling plate including a water-holding pan. The water-holding pan is formed by an enclosure for water storage additionally disposed on a support of the liquid cooling plate and a liquid leakage outlet disposed on the enclosure, and the water-holding pan is configured to accommodate the second leaked liquid and enable the second leaked liquid to flow from the liquid leakage outlet to the liquid leakage detection circuit. In this solution, the liquid cooling plate with the water-holding pan is disposed, to reduce a possibility that the second leaked liquid drips onto the electronic element, thereby improving implementability of this solution.

In another possible implementation, the flow guiding apparatuses include a second flow guiding apparatus, where the second flow guiding apparatus is a water-holding apparatus disposed below the liquid leakage outlet of the water-holding pan, and the other end of the second flow guiding apparatus is connected to the liquid leakage detection circuit. In this disclosure, the liquid cooling plate with the water-holding pan is disposed, to reduce a possibility that leaked liquid drips onto the electronic element, thereby improving implementability of this solution.

In another possible implementation, an included angle between the flow guiding apparatuses and a horizontal plane is not 0 degrees. In this solution, the included angle between the flow guiding apparatuses and the horizontal plane may be adjusted to improve efficiency of flow guiding of the flow guiding apparatuses for the first leaked liquid or the second leaked liquid, thereby further improving efficiency of liquid leakage detection of this solution.

In another possible implementation, the liquid leakage detection apparatus further includes a printed circuit board PCB, and the liquid leakage detection circuit and the electronic element are deployed on the PCB. In a specific implementation, the liquid leakage detection circuit and the electronic element are deployed on the PCB, to reduce production and debugging costs, thereby improving economic efficiency of this solution.

In another possible implementation, the liquid leakage detection circuit includes first conduction points and second conduction points, and the first conduction points and the second conduction points appear in pairs. The first conduction points and the second conduction points have a plurality of cooperation forms, and may be two adjacent pads or two spiral curves having a narrow gap. This is not limited herein. When the first liquid cooling pipe leaks, the first leaked liquid flows to the first conduction point through the first flow guiding apparatus, the first conduction point is connected to the second conduction point through the leaked liquid, and the liquid leakage detection circuit learns that the liquid leakage detection apparatus leaks. This disclosure provides the first conduction points and the second conduction points, to improve implementability of this solution.

In another possible implementation, one end of the first flow guiding apparatus is connected to a position at which an end opening of the sleeve is in contact with a liquid passing opening of the liquid cooling plate. In this disclosure, the end opening of the sleeve is in contact with the liquid passing opening of the liquid cooling plate, thereby improving integrity of wrapping the first liquid cooling pipe by the sleeve, and reducing a possibility that leaked liquid is in direct contact with the electronic element without passing through the sleeve. In addition, one end of the first flow guiding apparatus is located below the position at which the end opening of the sleeve is in contact with the liquid passing opening of the liquid cooling plate, and is configured hold leaked liquid that overflows from the sleeve and is further connected to the end opening of the sleeve. A specific contact position is not limited. This disclosure improves implementability of this solution.

In another possible implementation, an included angle between the first liquid cooling pipe and the liquid cooling plate at a connection position is not 0 degrees. In actual application of this disclosure, the first liquid cooling pipe needs to be fastened to the PCB, a height difference exists between the liquid cooling plate and the first liquid cooling pipe, and the included angle between the first liquid cooling pipe and the liquid cooling plate at the connection position is not 0 degrees, thereby improving implementability of this solution.

In another possible implementation, the electronic element is at least one of a central processing unit (CPU), an application-specific integrated circuit (ASIC), a programmable logic device (PLD), a field-programmable gate array (FPGA), or a generic array logic (GAL). This is not limited herein. This disclosure provides a possibility of the electronic element in actual application, thereby improving implementability of this disclosure.

In another possible implementation, the liquid cooling plate is disposed above the electronic element and is in contact with the electronic element. In this disclosure, the liquid cooling plate is disposed above the electronic element, and the liquid cooling plate is in contact with the electronic element, thereby improving efficiency of heat dissipation of this solution, and improving implementability of this solution.

In another possible implementation, the liquid cooling plate and the first liquid cooling pipe are integrally formed, and the integrally formed device has an advantage of high integral stability. No interface exists between the liquid cooling plate and the first liquid cooling pipe, thereby greatly reducing a risk of liquid leakage at an interface.

According to a second aspect, a liquid leakage detection method is provided, including, when a liquid leakage detection circuit is conducted, learning that a liquid leakage detection apparatus leaks, where the liquid leakage detection apparatus includes a first liquid cooling pipe, a liquid cooling plate, flow guiding apparatuses, a sleeve, and the liquid leakage detection circuit. The first liquid cooling pipe is configured to dissipate heat for an electronic element by using a coolant filled in the first liquid cooling pipe, the liquid cooling plate is configured to dispose a second liquid cooling pipe, the liquid cooling plate is connected to the first liquid cooling pipe, a type of a coolant filled in the second liquid cooling pipe is the same as a type of the coolant filled in the first liquid cooling pipe, and the coolant has a characteristic of conductivity, the flow guiding apparatuses are connected to an edge of the liquid cooling plate, and are configured to guide first leaked liquid and/or second leaked liquid to the liquid leakage detection circuit when the first leaked liquid occurs in the first liquid cooling pipe and/or the second leaked liquid occurs in the liquid cooling plate, the liquid leakage detection circuit is connected to the flow guiding apparatuses, and is configured to detect whether the apparatuses leak, and the sleeve is sleeved outside the first liquid cooling pipe, a gap exists between the sleeve and the first liquid cooling pipe, and the gap is used to accommodate the first leaked liquid occurring in the first liquid cooling pipe and guide the first leaked liquid to the flow guiding apparatuses.

According to a third aspect, a liquid leakage detection apparatus is provided, including an obtaining unit configured to learn that the liquid leakage detection apparatus leaks when a liquid leakage detection circuit is conducted. The liquid leakage detection apparatus includes a first liquid cooling pipe, a liquid cooling plate, flow guiding apparatuses, a sleeve, and the liquid leakage detection circuit. The first liquid cooling pipe is configured to dissipate heat for an electronic element by using a coolant filled in the cooling pipe, the liquid cooling plate is configured to dispose a second liquid cooling pipe, the liquid cooling plate is connected to the first liquid cooling pipe, a type of a coolant filled in the second liquid cooling pipe is the same as a type of the coolant filled in the first liquid cooling pipe, and the coolant has a characteristic of conductivity, the flow guiding apparatuses are connected to an edge of the liquid cooling plate, and are configured to guide first leaked liquid and/or second leaked liquid to the liquid leakage detection circuit when the first leaked liquid occurs in the first liquid cooling pipe and/or the second leaked liquid occurs in the liquid cooling plate, the liquid leakage detection circuit is connected to the flow guiding apparatuses, and is configured to detect whether the apparatuses leak, and the sleeve is sleeved outside the first liquid cooling pipe, a gap exists between the sleeve and the first liquid cooling pipe, and the gap is used to accommodate the first leaked liquid occurring in the first liquid cooling pipe and guide the first leaked liquid to the flow guiding apparatuses.

According to a fourth aspect, a liquid leakage detection apparatus is provided, where the liquid leakage detection apparatus includes one or more processors, the one or more processors are coupled to a memory, the memory stores program instructions, and when program instructions stored in the memory are executed by the one or more processors, the liquid leakage detection method described in the second aspect is implemented.

According to a fifth aspect, a computer device is provided, where the computer device includes a heat dissipation apparatus and an electronic element, the heat dissipation apparatus is configured to dissipate heat for the electronic element, and the heat dissipation apparatus is a heat dissipation apparatus according to the foregoing aspects or any possible implementation.

According to a sixth aspect, a computer-readable storage medium is provided, where the computer-readable storage medium stores instructions, and when the instructions are run on a computer, the computer may perform the method for liquid leakage detection in the second aspect.

In this disclosure, based on the implementations provided in the foregoing aspects, the implementations may be further combined to provide more implementations.

DESCRIPTION OF EMBODIMENTS

Embodiments of this disclosure provide a liquid leakage detection apparatus and a liquid leakage detection method. The liquid leakage detection apparatus can detect occurrence of liquid leakage before leaked liquid of a liquid cooling apparatus overflows to an electronic element, thereby improving security of the electronic element.

To understand this disclosure more comprehensively, the following further describes design ideas of technical solutions described in this disclosure.

Figure 1:
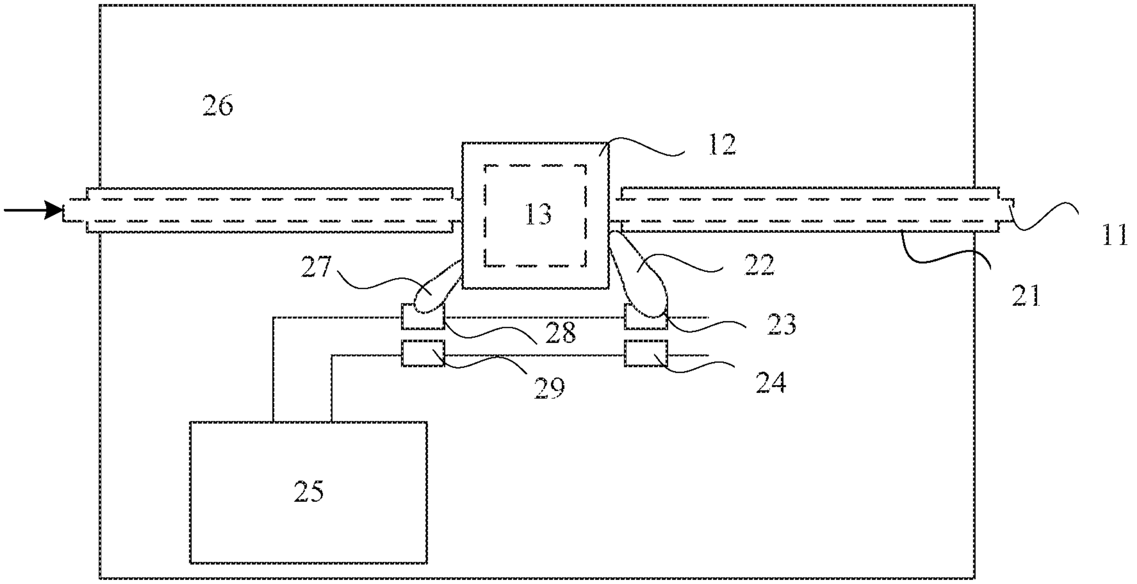
FIG. 1 is a schematic diagram of a structure of a liquid leakage detection apparatus according to this disclosure.
Figure 2:
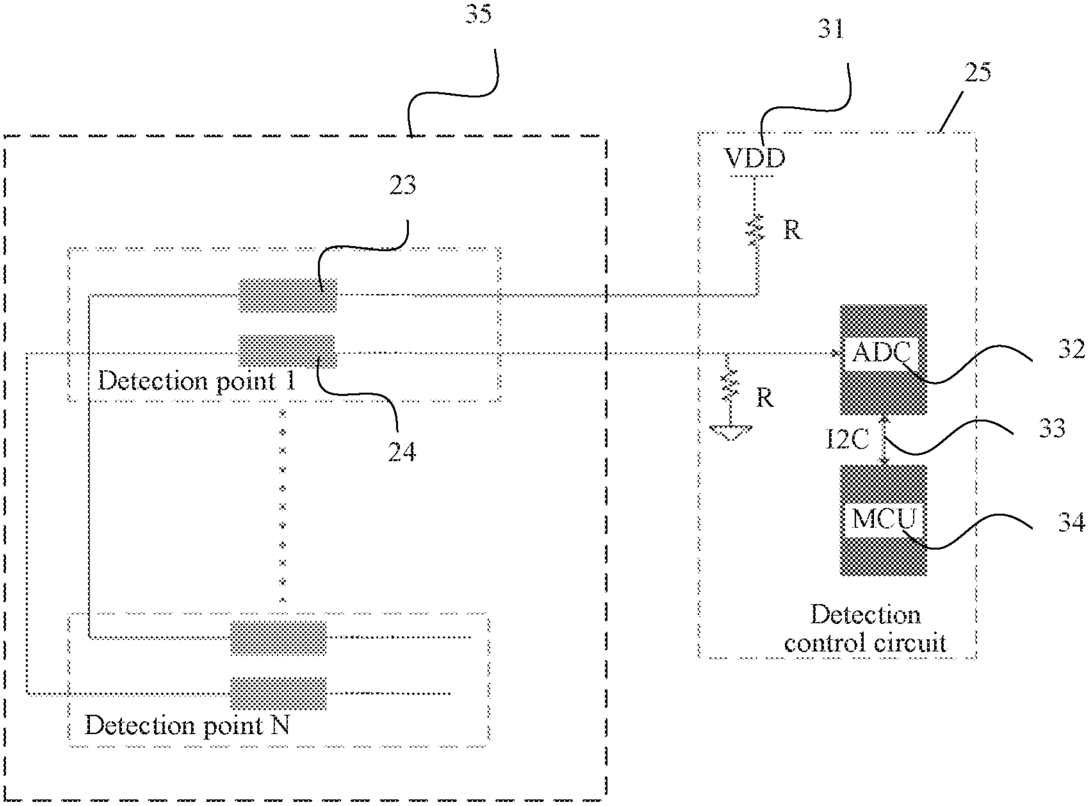
FIG. 2 is a schematic diagram of a liquid leakage detection circuit according to this disclosure.

As shown in FIG. 1, this disclosure provides a liquid leakage detection apparatus, where the apparatus includes a sleeve 21, flow guiding apparatuses (22, 27), and a liquid leakage detection circuit 25. The apparatus is configured to perform liquid leakage detection for a liquid cooling apparatus formed by a first liquid cooling pipe 11 and a liquid cooling plate 12, where the liquid cooling apparatus is configured to cool an electronic element 13. In this disclosure, a characteristic of conductivity of a coolant is used, and an open circuit region 35, shown in FIG. 2, is disposed on the liquid leakage detection circuit 25. When a liquid leakage problem occurs in the apparatus, the sleeve 21 and the flow guiding apparatuses (22, 27) guide a leaked coolant to the open circuit region 35. The liquid leakage detection circuit 25 learns, based on voltage monitoring on the open circuit region 35, whether the open circuit region 35 has a voltage, to determine whether the open circuit region 35 is conducted, to determine whether liquid leakage occurs. The coolant mentioned in this disclosure is conductive liquid, and commonly includes tap water, salt water of different concentrations, and the like.

The sleeve 21 is sleeved outside the first liquid cooling pipe 11, and one end of the first liquid cooling pipe 11 is connected to the liquid cooling plate 12. When the first liquid cooling pipe 11 leaks, first leaked liquid is held by the sleeve 21, overflows from one end of the sleeve 21, and flows to the liquid leakage detection circuit 25 through a first flow guiding apparatus 22. Then the liquid leakage detection circuit 25 is conducted, and the liquid leakage detection circuit 25 learns that the liquid cooling apparatus leaks. To improve security of this solution, the sleeve 21 increases a size of a region that wraps the first liquid cooling pipe 11 as much as possible. In this way, one end of the sleeve 21 is close to or even in contact with the liquid cooling plate 12 at a joint between the first liquid cooling pipe 11 and the liquid cooling plate 12. The first leaked liquid may occur in a region outside the first liquid cooling pipe 11 and on which the sleeve 21 is sleeved, or may occur at the joint between the first liquid cooling pipe 11 and the liquid cooling plate 12. However, in actual application, one end of the sleeve 21 is close to the liquid cooling plate 12, so that a manner of disposing the first flow guiding apparatus at a same position may be used to guide a leaked coolant for leaked liquid in the two cases. In this solution, the coolant leaked from the first liquid cooling pipe 11 is collectively referred to as the first leaked liquid, and the first flow guiding apparatus 22 is used to guide the first leaked liquid.

Figure 4:
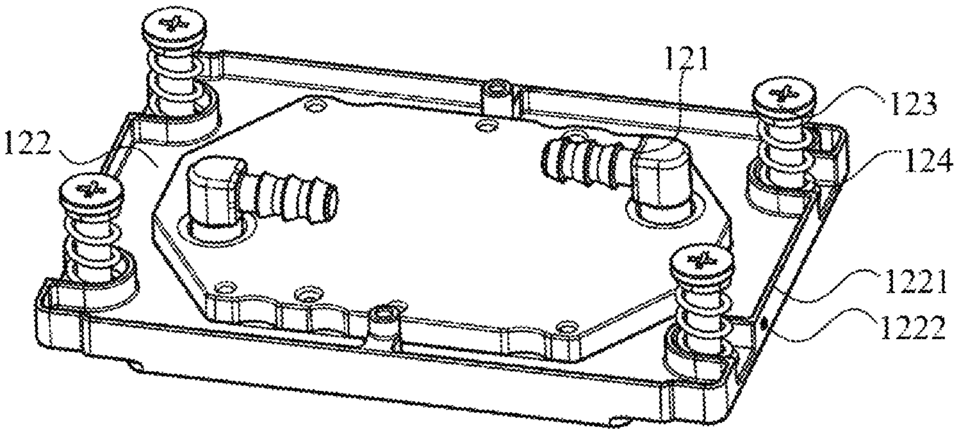
FIG. 4 is a schematic diagram of a structure of another liquid cooling plate according to this disclosure.

According to different flow guiding positions and different designs of the liquid cooling plate 12, the flow guiding apparatuses (22, 27) include the first flow guiding apparatus 22 and a second flow guiding apparatus 27. The first flow guiding apparatus 22 is configured to guide the first leaked liquid that leaks from the first liquid cooling pipe 11 and/or the joint between the first liquid cooling pipe 11 and the liquid cooling plate 12. The first flow guiding apparatus 22 is disposed below the joint between the first liquid cooling pipe 11 and the liquid cooling plate 12, and may be disposed at a specific angle based on a requirement. One end of the first flow guiding apparatus 22 is connected to the liquid leakage detection circuit 25. In this way, when the liquid leakage detection apparatus is designed, the angle may be adjusted to adjust detection efficiency of the liquid leakage detection circuit 25 when the first leaked liquid and/or second leaked liquid occur. As shown in FIG. 4, when the liquid cooling plate 12 is a liquid cooling plate 12 provided with a water-holding pan 122, a liquid leakage outlet 1222 is further provided on the water-holding pan 122 of the liquid cooling plate 12. The second flow guiding apparatus 27 is disposed between the liquid cooling plate 12 and the liquid leakage detection circuit 25. One end of the second flow guiding apparatus 27 is connected to the liquid leakage detection circuit 25, and the other end is located below the liquid leakage outlet 1222 of the liquid cooling plate 12 to hold leaked liquid of the liquid cooling plate 12. The second flow guiding apparatus 27 may also be disposed at a specific angle based on a requirement. When the liquid cooling plate 12 leaks, due to an effect of gravity, the leaked liquid drips into the water-holding pan 122 of the liquid cooling plate 12. The second flow guiding apparatus 27 guides the leaked liquid from the water-holding pan to the liquid leakage detection circuit 25, and the liquid leakage detection circuit 25 is conducted, so that the liquid leakage detection circuit 25 learns that the liquid cooling apparatus leaks. It should be noted that flow guiding mentioned in this disclosure is to limit a flow path of liquid by using a specific structure, and how the flow is generated is not limited herein. In actual application, the first leaked liquid and the second leaked liquid may flow in a flow guiding apparatus because the flow guiding apparatus (22, 27) is disposed obliquely. Optionally, the liquid may alternatively be accumulated to a specific extent and continuously extend along a specified flow path. A description herein is intended to help understand a specific use manner of each component. For an implementation of this solution, refer to descriptions in specific embodiments.

Based on the foregoing idea, the following further describes the technical solutions provided in this disclosure.

For example, FIG. 1 is a schematic diagram of a structure of a liquid leakage detection apparatus according to this disclosure. First, a liquid cooling apparatus in embodiments of this disclosure is briefly described with reference to FIG. 1. For ease of description, the schematic diagram shows only a part related to embodiments of this disclosure.

Figure 3:
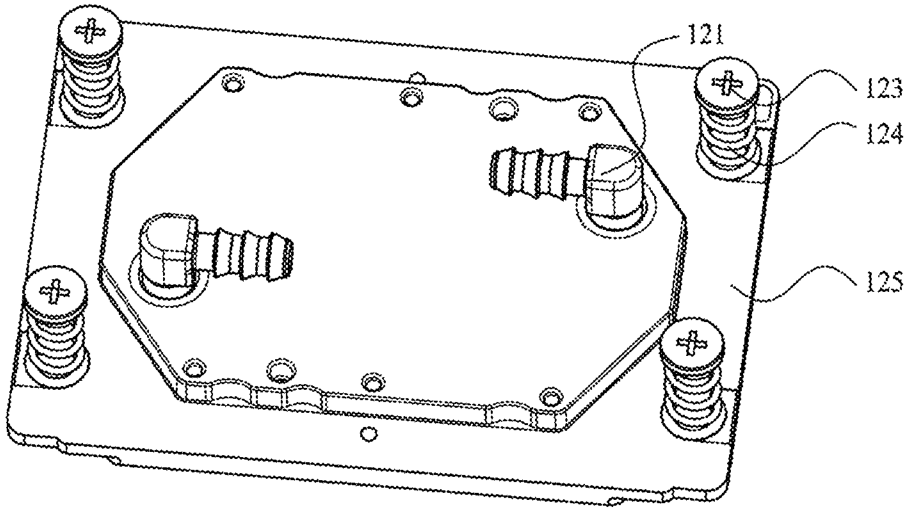
FIG. 3 is a schematic diagram of a structure of a liquid cooling plate according to this disclosure.

One end of the first liquid cooling pipe 11 is connected to a liquid cooling connector 121 disposed in the liquid cooling plate 12 and shown in FIG. 3, the liquid cooling plate 12 is disposed above the electronic element 13, the electronic element 13 is disposed on a printed circuit board (PCB) 26, and the liquid cooling plate 12 may be in direct contact with the electronic element 13 or in indirect contact with the electronic element 13 by using a conductive material, to conduct heat generated by the electronic element 13 to a coolant in a second liquid cooling pipe of the liquid cooling plate 12. Generally, the coolant flows in the first liquid cooling pipe 11 and the second liquid cooling pipe of the liquid cooling plate 12 due to an action of a compressor, and directly or indirectly performs heat transfer with the electronic element 13 in a flow process, to reduce a temperature of the electronic element 13, thereby achieving an objective of cooling. It should be noted that a heat conducting medium herein is not limited, and may be a material having a specific heat conducting property, for example, air or silica gel.

The following describes a liquid leakage detection apparatus provided in an embodiment of this disclosure with reference to FIG. 1. The liquid leakage detection apparatus provided in this embodiment of this disclosure includes a first liquid cooling pipe 11, a liquid cooling plate 12, a sleeve 21, flow guiding apparatuses (22, 27), and a liquid leakage detection circuit 25. The liquid leakage detection circuit 25 includes conduction points (23, 24, 28, and 29), and the conduction points (23, 24, 28, and 29) are disposed in an open circuit region of the liquid leakage detection circuit 25.

First, the sleeve 21 may be disposed outside the first liquid cooling pipe 11. In an application, the sleeve 21 increases a size of a region that wraps the first liquid cooling pipe 11 as much as possible. In this way, one end of the sleeve 21 is close to or even in contact with the liquid cooling plate 12 at a joint between the first liquid cooling pipe 11 and the liquid cooling plate 12. A first flow guiding apparatus 22 is disposed below the joint between the first liquid cooling pipe 11 and the liquid cooling plate 12, and may hold first leaked liquid that occurs in each region of the first liquid cooling pipe 11. The other end of the first flow guiding apparatus 22 is connected to a first conduction point 23, the first conduction point 23 is connected to a voltage drain drain (VDD) 31 in a detection control circuit shown in FIG. 2, and a second conduction point 24 is connected to an analog to digital converter (ADC) 32 in the detection control circuit shown in FIG. 2.

For example, FIG. 2 is a schematic diagram of a liquid leakage detection circuit (or a detection control circuit) according to this disclosure. A first conduction point 23 and a second conduction point 24 are copper exposure points on a conducting wire in an open circuit region 35 of a liquid leakage detection circuit 25. The first conduction point 23 is connected to a VDD 31 in a detection control circuit, the second conduction point 24 is connected to an ADC 32 in the detection control circuit, and the ADC 32 is connected to a micro control unit (MCU) 34 by using an Inter-Integrated Circuit (I2C) 33. The MCU 34 is configured to perform a preset action when learning that a liquid cooling apparatus leaks.

When a region outside the first liquid cooling pipe 11 and on which the sleeve 21 is sleeved leaks, first leaked liquid is stored by the sleeve 21, and flows out from one end of the sleeve 21 to the first flow guiding apparatus 22. If the first flow guiding apparatus 22 is disposed at a specific angle, one end of the first flow guiding apparatus 22 that is close to the first conduction point 23 is lower than the joint between the first liquid cooling pipe 11 and the liquid cooling plate 12. Therefore, the first leaked liquid flows along the first flow guiding apparatus 22 to the first conduction point 23 due to an effect of gravity. When the first leaked liquid accumulates to a specific extent at the first conduction point 23, the first leaked liquid is affected by a liquid surface tension and spreads to the second conduction point 24. The leaked liquid connects the first conduction point 23 to the second conduction point 24. The liquid leakage detection circuit 25 learns, by monitoring a voltage between the VDD 31 and the ADC 32, that a voltage is generated between the VDD 31 and the ADC 32, to learn that the liquid cooling apparatus leaks. The liquid leakage detection circuit 25 may perform a preset action after learning that the liquid cooling apparatus leaks, for example, sending an alarm after learning that the liquid cooling apparatus leaks. Alternatively, after learning that the liquid cooling apparatus leaks, the liquid leakage detection circuit may perform a power-off operation for a circuit board in a device. Alternatively, after learning that the liquid cooling apparatus leaks, the liquid leakage detection circuit feeds back a signal to a control terminal, so that the control terminal may stop working of the liquid cooling apparatus.

When the joint between the first liquid cooling pipe 11 and the liquid cooling plate 12 leaks, the first leaked liquid drips to the first flow guiding apparatus 22. If the first flow guiding apparatus 22 is horizontally disposed, the first leaked liquid accumulates continuously and spreads from the first flow guiding apparatus 22 to the first conduction point 23. When the first leaked liquid accumulates to a specific extent at the first conduction point 23, the first leaked liquid is affected by a liquid surface tension and spreads to the second conduction point 24. The leaked liquid connects the first conduction point 23 to the second conduction point 24. The liquid leakage detection circuit 25 learns, by monitoring the voltage between the VDD 31 and the ADC 32, that a voltage is generated between the VDD 31 and the ADC 32, to learn that the liquid cooling apparatus leaks. When the first flow guiding apparatus 22 is horizontally disposed, because the leaked liquid needs to accumulate to a specific amount before spreading to the first conduction point 23, efficiency of liquid leakage detection may be significantly improved by disposing the first flow guiding apparatus 22 at a suitable angle.

It should be noted that this embodiment of this disclosure only provides a specific circuit for implementing the liquid leakage detection circuit. In actual application, a specific layout and design of the liquid leakage detection circuit are not limited.

Based on an impact of whether the first flow guiding apparatus 22 is disposed at an angle on the efficiency of liquid leakage detection when the first leaked liquid occurs, it may be learned in this disclosure that, an angle set between the sleeve 21 and a horizontal plane may affect the efficiency of liquid leakage detection in this disclosure. Therefore, it is proposed herein that a status of the sleeve 21 may be affected by disposing the first liquid cooling pipe 11 in different forms and at different angles. Because the efficiency of liquid leakage detection of this disclosure is substantially affected by the status of the sleeve 21, only the status of the sleeve 21 is discussed herein. When the first liquid cooling pipe 11 leaks, for the sleeve 21, the status of the sleeve 21 may be any one of the following listed three cases:

Case 1: A vertical distance from a midpoint of the sleeve 21 to the electronic element 13 is greater than a vertical distance from two ends of the sleeve 21 to the electronic element 13. In this case, when the first liquid cooling pipe 11 leaks, the first leaked liquid flows out from the two ends of the sleeve 21 due to an effect of gravity. The first leaked liquid is guided by the first flow guiding apparatus 22 to the first conduction point 23. After the leaked liquid accumulates to a specific extent, the surface tension of the liquid is insufficient to support a droplet, and the leaked liquid spreads to the second conduction point 24. The leaked liquid connects the first conduction point 23 to the second conduction point 24. The liquid leakage detection circuit 25 learns, by monitoring the voltage between the VDD 31 and the ADC 32, that a voltage is generated between the VDD 31 and the ADC 32, and further learns that the liquid cooling apparatus leaks.

Case 2: A vertical distance from a midpoint of the sleeve 21 to the electronic element 13 is less than a vertical distance from two ends of the sleeve 21 to the electronic element 13. In this case, when the first liquid cooling pipe 11 leaks, the leaked liquid accumulates toward the midpoint of the sleeve 21 due to an effect of gravity. When a liquid surface height is flush with an end opening of the sleeve 21, the leaked liquid starts to overflow from the end opening of the sleeve 21. The leaked liquid is guided by the first flow guiding apparatus 22 to the first conduction point 23. After the leaked liquid accumulates to a specific extent, the surface tension of the liquid is insufficient to support a droplet, and the leaked liquid spreads to the second conduction point 24. The leaked liquid connects the first conduction point 23 to the second conduction point 24. The liquid leakage detection circuit 25 learns, by monitoring the voltage between the VDD 31 and the ADC 32, that a voltage is generated between the VDD 31 and the ADC 32, and further learns that the liquid cooling apparatus leaks.

Case 3: The sleeve 21 is a straight sleeve, and a vertical distance from one end of the sleeve 21 to the electronic element 13 is greater than that of the other end of the sleeve 21. When the first liquid cooling pipe 11 leaks, the leaked liquid leaks out due to an effect of gravity from one end of the sleeve 21 from which a vertical distance to the electronic element 13 is closer. The leaked liquid is guided by the first flow guiding apparatus 22 to the first conduction point 23. After the leaked liquid accumulates to a specific extent, the surface tension of the liquid is insufficient to support a droplet, and the leaked liquid spreads to the second conduction point 24. The leaked liquid connects the first conduction point 23 to the second conduction point 24. The liquid leakage detection circuit 25 learns, by monitoring the voltage between the VDD 31 and the ADC 32, that a voltage is generated between the VDD 31 and the ADC 32, and further learns that the liquid cooling apparatus leaks.

The foregoing three cases have respective advantages. In the case 1, a speed at which the leaked liquid leaks from the sleeve 21 may be accelerated, and occurrence of liquid leakage can be detected as soon as possible, thereby improving efficiency of processing an abnormality. In the case 2, the leaked liquid may accumulate to a specific extent and then overflow from the sleeve 21, so that a time from occurrence of the leaked liquid to overflow of the leaked liquid from an end opening of the sleeve 21 may be prolonged as much as possible based on that security of the PCB 26 is ensured, so that the circuit may run normally when liquid leakage occurs but is not serious. In the case 3, the leaked liquid may stably accumulate to one end based on a height difference between the two ends, and arrangement of the flow guiding apparatus may be reduced by a proper design, thereby reducing occupied space on the PCB 26.

In addition, the liquid cooling plate 12 in the liquid cooling apparatus has a plurality of designs. For a specific form of the liquid cooling plate 12, refer to FIG. 3, which is a schematic diagram of a structure of a liquid cooling plate according to this disclosure. The liquid cooling plate 12 provided in FIG. 3 is a structure including a liquid cooling connector 121, a fastening screw 123, a spring 124, and a substrate 125. The fastening screw 123 passes through the spring 124 and is connected to the PCB 26 in a threaded connection manner. One end of the spring 124 is connected to the fastening screw 123, and the other end of the spring 124 is connected to the substrate 125.

Optionally, the liquid cooling plate 12 may alternatively be a liquid cooling plate 12 on which a water-holding pan is additionally disposed, based on the liquid cooling plate 12 shown in FIG. 3. For a specific form of the liquid cooling plate 12, refer to FIG. 4, which is a schematic diagram of a structure of another liquid cooling plate 12 according to this disclosure. The liquid cooling plate 12 is provided with a water-holding pan 122. There are different liquid leakage drainage solutions based on a distance from the liquid cooling plate to the liquid leakage detection circuit in a design of the PCB 26. The following describes a case in which a specific distance exists between the liquid cooling plate 12 and the liquid leakage detection circuit 25.

In this embodiment of this disclosure, the liquid cooling plate 12 provided in FIG. 4 is a structure including a liquid cooling connector 121, a water-holding pan 122, a fastening screw 123, and a spring 124. The water-holding pan 122 is provided with an enclosure 1221 and a liquid leakage outlet 1222. The enclosure 1221 is configured to limit leaked liquid from overflowing to the PCB 26, and the liquid leakage outlet 1222 is configured to release the leaked liquid from the water-holding pan 122. The fastening screw 123 passes through the spring 124 and is connected to the PCB 26 in a threaded connection manner. One end of the spring 124 is connected to the fastening screw 123, and the other end of the spring 124 is connected to the water-holding pan 122.

It should be noted that a liquid cooling plate 12 that does not include the water-holding pan 122 has a plurality of forms, and the liquid cooling plate in FIG. 3 is merely a possible form.

Optionally, the liquid leakage detection apparatus further includes a second flow guiding apparatus 27. The second flow guiding apparatus 27 is connected to the liquid leakage outlet 1222 of the liquid cooling plate 12, the other end of the second flow guiding apparatus 27 is connected to a first conduction point 28, and the first conduction point 28 is connected to the VDD 31 in the liquid leakage detection circuit 25. A second conduction point 29 is connected to the ADC 32 in the liquid leakage detection circuit 25. When the liquid cooling plate 12 leaks, leaked liquid flows from the water-holding pan 122 of the liquid cooling plate 12 to the first conduction point 28 through the second flow guiding apparatus 27. When the leaked liquid accumulates to a specific extent, the leaked liquid is affected by a liquid surface tension and spreads to the second conduction point 29. The leaked liquid connects the first conduction point 28 to the second conduction point 29. The liquid leakage detection circuit 25 learns, by monitoring a voltage between the VDD 31 and the ADC 32, that the voltage fluctuates, and further learns that the liquid cooling apparatus leaks.

Optionally, a design of the PCB 26 further includes a case in which the liquid cooling plate 12 is located above the liquid leakage detection circuit 25.

Figure 5:
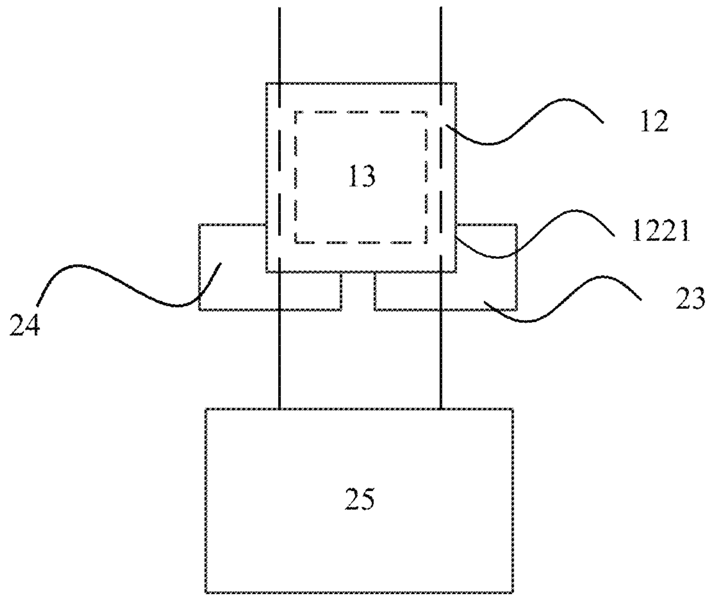
FIG. 5 is a schematic diagram of a structure of another liquid leakage detection apparatus according to this disclosure.

FIG. 5 is a schematic diagram of a structure of another liquid leakage detection apparatus according to this disclosure. FIG. 5 shows that, due to different designs of the PCB 26, the liquid cooling plate 12 is located above the liquid leakage detection circuit 25, the first conduction point 23 is located below a liquid leakage outlet 1222 of the liquid cooling plate 12, and the first conduction point 23 is connected to the VDD 31 in the liquid leakage detection circuit 25. The second conduction point 24 is connected to the ADC 32 in the liquid leakage detection circuit 25. When the liquid cooling plate 12 leaks, leaked liquid flows from the liquid leakage outlet 1222 to the first conduction point 23 through the water-holding pan 122 of the liquid cooling plate 12. When the leaked liquid accumulates to a specific extent, the leaked liquid is affected by a liquid surface tension and spreads to the second conduction point 24. The leaked liquid connects the first conduction point 23 to the second conduction point 24. The liquid leakage detection circuit 25 learns, by monitoring a voltage between the VDD 31 and the ADC 32, that the voltage fluctuates, and further learns that the liquid cooling apparatus leaks.

It should be noted that, although both the first conduction point 23 and the first conduction point 28 in the foregoing solutions are connected to the VDD 31 in the liquid leakage detection circuit 25, no interdependent relationship exists in essence, and the first conduction point 23 may also be directly connected to the VDD 31 in a case in which the first conduction point 28 does not exist. Similarly, for the second conduction point 24 and the second conduction point 29, the second conduction point 24 may be directly connected to the ADC 32 in a case in which the second conduction point 29 does not exist.

It should be noted that, because the liquid cooling plate 12 is mostly produced in an integrated form, in actual application, the leaked liquid seldom occurs in the liquid cooling plate 12, and the leaked liquid of the liquid cooling plate 12 mostly occurs at a joint between the liquid cooling plate 12 and the first liquid cooling pipe 11. This embodiment of this disclosure only provides an optimal selection, and a specific form of the liquid cooling plate 12 is not limited in this embodiment of this disclosure.

Figure 6:
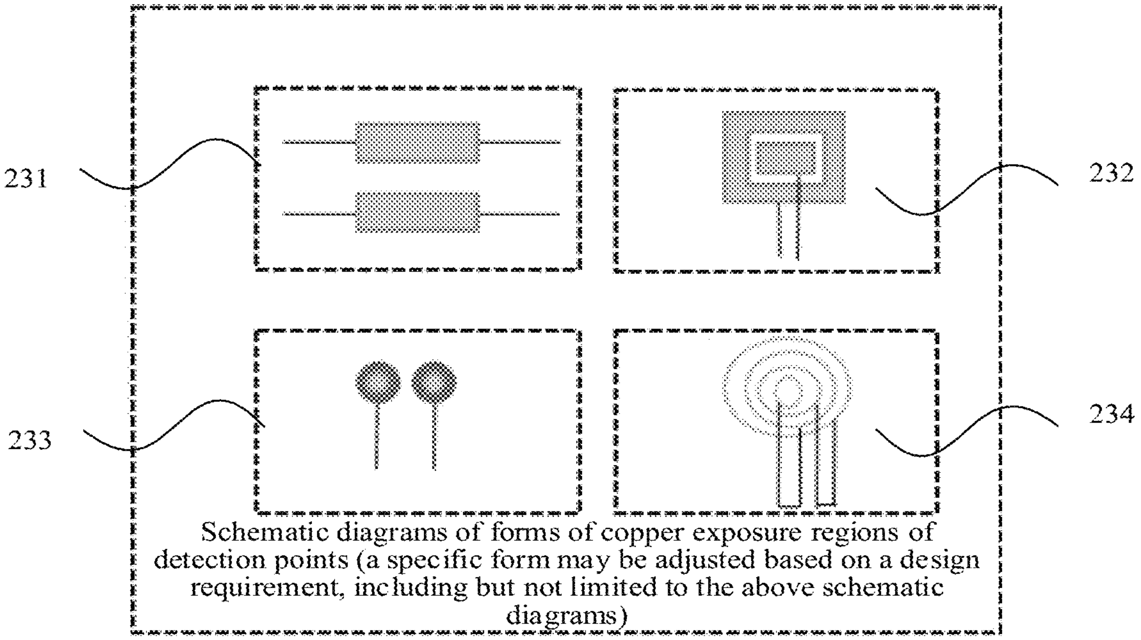
FIG. 6 is a schematic diagram of shapes of a conduction point according to this disclosure.

In actual application, the conduction point has a plurality of forms that can implement functions in embodiments of this disclosure. Some possibilities are provided herein for reference. FIG. 6 is a schematic diagram of shapes of a conduction point according to this disclosure. Several common shapes are listed in FIG. 6. The following describes conduction points in different forms with reference to the schematic diagram.

In actual application, the conduction point is formed by performing wiring on the PCB 26 to a surface layer of the board and exposing copper. A copper exposure outline of the conduction point may have a plurality of forms, including but not limited to a PCB 26 wire 231, a pad 232, a via 233, and a spiral curve 234. Among the four listed forms of the conduction point, the spiral curve 234 is more prominent in actual application. The spiral curve 234 may make two conduction points closer, and a shape of the spiral curve enables the two conduction points to be connected with less liquid, thereby improving efficiency of liquid leakage detection. In order to avoid failure caused by oxidation in application, a surface of the conduction point may also be processed with tin printing or gold plating. From the perspective of security, when a copper exposure distance between two adjacent conduction points in the foregoing forms is greater than 2 millimeters (mm), short-circuit caused by wet and dust can be prevented, and setting a copper exposure minimum width between the conduction points to 2 mm, an open circuit can be prevented from being corroded.

It should be noted that a specific form of the conduction point is not limited, and only some optional items are provided herein for implementation of this solution.

In this embodiment of this disclosure, the sleeve 21 is wrapped outside the first liquid cooling pipe 11, and the first flow guiding apparatus 22 is disposed to guide the leaked liquid overflowing from the sleeve 21 to the liquid leakage detection circuit 25, so that occurrence of liquid leakage can be detected before the leaked liquid of the liquid cooling apparatus overflows to the electronic element 13, thereby improving security of the liquid leakage detection solution.

In actual application, the liquid leakage detection circuit 25 and the electronic element 13 may be deployed on a same PCB 26, or may be respectively deployed on two different PCBs 26 and connected by using a wire.

In actual application, to further improve security of this solution and portability of the detection control circuit, during a design of the PCB 26, an electronic engineer may also separate a circuit board that implements functions from the detection control circuit.

Figure 7:
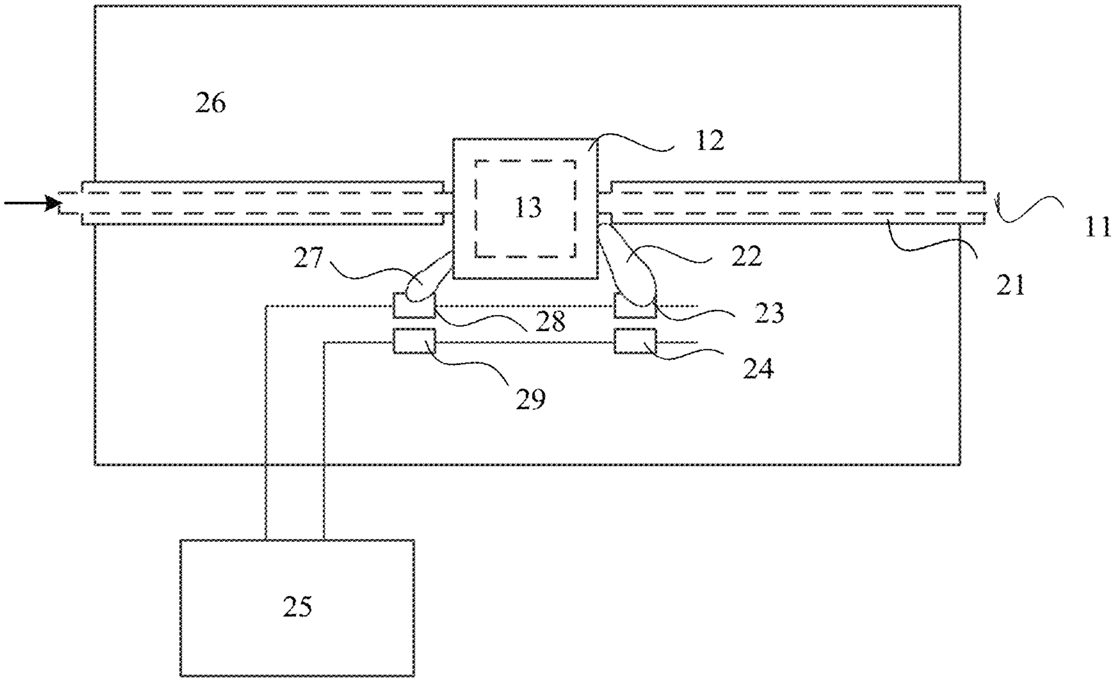
FIG. 7 is a schematic diagram of a structure of another liquid leakage detection apparatus according to this disclosure.

FIG. 7 is a schematic diagram of a structure of another liquid leakage detection apparatus according to this disclosure. FIG. 7 describes a case in which a detection control circuit and an electronic element 13 are deployed on different PCBs 26.

The liquid leakage detection apparatus provided in this embodiment of this disclosure includes a liquid cooling apparatus. The liquid cooling apparatus includes a first liquid cooling pipe 11 and a liquid cooling plate 12. A liquid passing opening at one end of the first liquid cooling pipe 11 is connected to a liquid passing opening of the liquid cooling plate 12, and the liquid cooling plate 12 is disposed above the electronic element 13.

In this embodiment of this disclosure, the liquid leakage detection apparatus further includes a sleeve 21, a first flow guiding apparatus 22, a second flow guiding apparatus 27, and a liquid leakage detection circuit 25, where the sleeve 21 wraps the first liquid cooling pipe 11, one end of the first flow guiding apparatus 22 is located below an end opening of an end of the sleeve 21 that is close to the liquid cooling plate 12 and is connected to the sleeve 21, the other end of the first flow guiding apparatus 22 is connected to a first conduction point 23, the first conduction point 23 is connected to a VDD 31 in the liquid leakage detection circuit 25, and a second conduction point 24 is connected to an ADC 32 in the liquid leakage detection circuit 25. The liquid leakage detection circuit 25 is separated from the PCB 26 on which the electronic element 13 is located, and the liquid leakage detection circuit 25 is connected to the conduction points by using a wire or a cable. When the first liquid cooling pipe 11 leaks, leaked liquid flows from the sleeve 21 to the first conduction point 23 through the first flow guiding apparatus 22. When the leaked liquid accumulates to a specific extent, the leaked liquid is affected by a liquid surface tension and spreads to the second conduction point 24. The leaked liquid connects the first conduction point 23 to the second conduction point 24. The liquid leakage detection circuit 25 learns, by monitoring a voltage between the VDD 31 and the ADC 32, that the voltage fluctuates, to learn that the liquid cooling apparatus leaks. The liquid leakage detection circuit 25 may perform a preset action after learning that the liquid cooling apparatus leaks. Specific content of the preset action is not limited herein. In this embodiment of this disclosure, the liquid leakage detection apparatus further includes a first conduction point 28 and a second conduction point 29.

In this embodiment of this disclosure, the detection control circuit and a functional circuit in which the electronic element 13 is located are respectively disposed on two PCBs 26, so that security of this solution and portability of the detection control circuit are further improved.

The foregoing describes the liquid leakage detection apparatus in embodiments of this disclosure. The following describes a liquid leakage detection method in embodiments of this disclosure.

Figure 8:
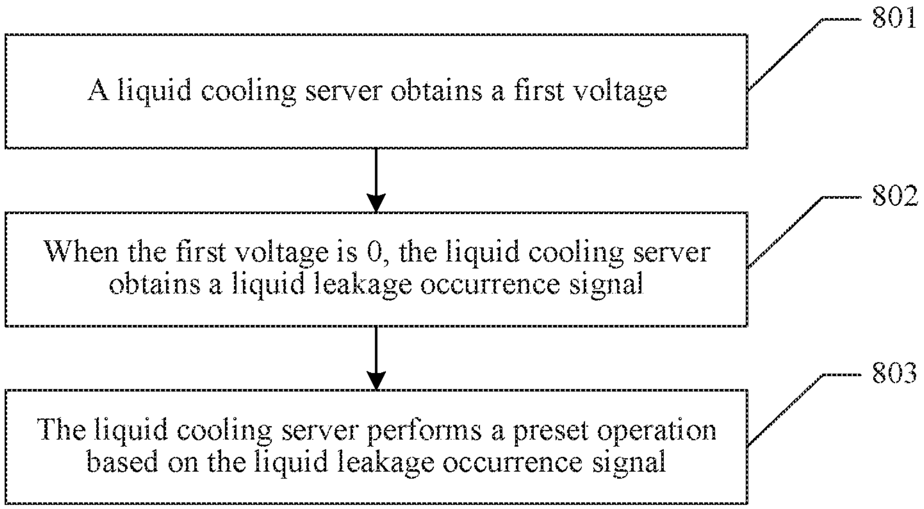
FIG. 8 is a flowchart of a liquid leakage detection method according to this disclosure.

FIG. 8 is a flowchart of a liquid leakage detection method according to this disclosure. FIG. 8 describes a case in which, when liquid leakage occurs, a liquid leakage detection circuit 25 of a liquid cooling server is conducted, thereby learning that a liquid leakage detection apparatus leaks. The liquid leakage detection circuit 25 performs a preset action after learning that the liquid leakage detection apparatus leaks.

Step 801: The liquid cooling server obtains a first voltage.

In the liquid cooling server, an ADC 32 of the liquid leakage detection circuit 25 considers that a resistor is disposed between the ADC 32 and a VDD 31, and the ADC 32 continuously obtains a voltage on the resistor, that is, a first voltage between the ADC 32 and the VDD 31. When no liquid leakage occurs, an open circuit exists between the ADC 32 and the VDD 31, and the first voltage is 0, and when liquid leakage occurs, a short circuit exists between the ADC 32 and the VDD 31, and the first voltage is not 0.

Step 802: When the first voltage is not 0, the liquid cooling server obtains a liquid leakage occurrence signal.

When the first voltage is 0, an open circuit exists between the corresponding ADC 32 and VDD 31, indicating that no liquid leakage occurs, and when the first voltage is not 0, a short circuit exists between the ADC 32 and VDD 31, indicating that liquid leakage occurs. When obtaining that the first voltage is not 0, the ADC 32 sends the liquid leakage occurrence signal to a control circuit of the liquid cooling server, so that the liquid cooling server obtains the liquid leakage occurrence signal.

Step 803: The liquid cooling server performs a preset action based on the liquid leakage occurrence signal.

After learning that liquid leakage occurs, the liquid cooling server performs an action preset by a developer in a control system based on the liquid leakage occurrence signal. Further, the preset action may be sending an alarm after obtaining the liquid leakage occurrence signal, or performing a power-off operation for a computer device after obtaining the liquid leakage occurrence signal, or after obtaining the liquid leakage occurrence signal, feeding back a signal to a control terminal for controlling switch-on and switch-off of the liquid cooling apparatus. The control terminal may stop working of the liquid cooling apparatus or the like, and the control terminal may be a processor provided with a liquid cooling apparatus switch program. This is not limited herein.

It should be noted that the preset action herein is merely an example, and an operation in a specific case is not limited herein.

In this embodiment of this disclosure, a first voltage is obtained, when the first voltage is not zero, a liquid leakage occurrence signal is obtained, and the liquid cooling server performs a preset action based on the liquid leakage occurrence signal, thereby improving implementability of the liquid leakage detection method.

The foregoing describes the liquid leakage detection method implemented by the liquid cooling server, and the following describes the liquid cooling server.

Figure 9:
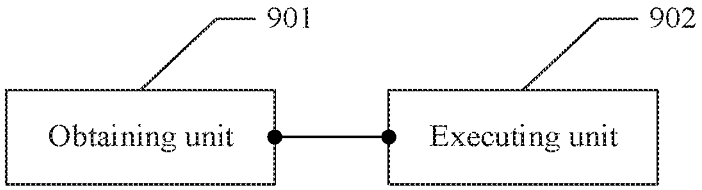
FIG. 9 is a schematic diagram of a structure of a liquid cooling server according to this disclosure.

FIG. 9 is a schematic diagram of a structure of a liquid cooling server according to this disclosure. The liquid cooling server includes an obtaining unit 901 configured to obtain a first voltage, the obtaining unit 901 being further configured to obtain a liquid leakage occurrence signal when the first voltage is not zero, and an executing unit 902 configured to perform a preset action based on the liquid leakage occurrence signal.

Functions and procedures performed by the units of the liquid cooling server in this embodiment of this disclosure are similar to functions and procedures performed by the liquid cooling server in FIG. 8. Details are not described herein again.

Figure 10:
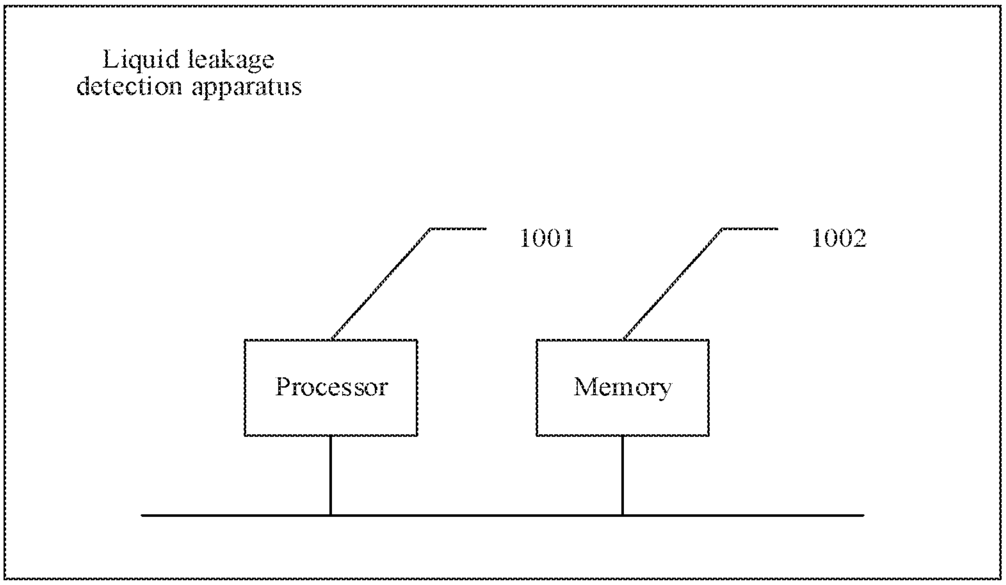
FIG. 10 is a schematic diagram of a structure of another liquid leakage detection apparatus according to this disclosure.

FIG. 10 is a schematic diagram of a structure of another liquid leakage detection apparatus according to this disclosure. The liquid leakage detection apparatus includes a processor 1001 and a memory 1002, where the processor 1001 is coupled to the memory 1002, and the memory 1002 stores program instructions. When program instructions stored in the memory 1002 are executed by the processor 1001, functions and procedures performed by the liquid leakage detection apparatus in FIG. 8 are implemented. Details are not described herein again. The processor 1001 may be implemented by using an ASIC or a PLD. The PLD may be a complex PLD (CPLD), an FPGA, a GAL, or any combination thereof.

This disclosure further provides a computer device, for example, a server. The computer device includes any heat dissipation apparatus shown in FIG. 1 to FIG. 7, where the heat dissipation apparatus is configured to dissipate heat for an electronic element in the computing device.

An embodiment of this disclosure further provides a computer storage medium. The computer storage medium is configured to store computer software instructions used by the computer device, and the computer software instructions include a program for executing a preset action designed for a leakage detection apparatus.

The liquid leakage detection apparatus may be the liquid leakage detection apparatus described in FIG. 8.

An embodiment of this disclosure further provides a computer program product, where the computer program product includes computer software instructions, and the computer software instructions may be loaded by a processor to implement the procedures in the liquid leakage detection method in FIG. 8.

In this disclosure, unless otherwise explicitly specified or defined, terms such as "mount", "connect", "connection", "fasten", and "dispose" should be understood in a broad sense. For example, the connection may be a fixed connection, a detachable connection, or an integral connection, or the connection may be a mechanical connection, or the connection may be a direct connection, an indirect connection through an intermediary, or internal communication between two elements or a mutual interaction relationship between two elements. A person of ordinary skill in the art may understand specific meanings of the foregoing terms in this disclosure based on a specific situation.

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on a computer, all or some of the procedures or functions according to embodiments of this disclosure of the present disclosure are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium, or the like. The semiconductor medium may be a solid-state drive (SSD).

The foregoing descriptions are merely specific implementations of this disclosure of the present disclosure. Any variation or replacement figured out by a person skilled in the art according to the specific implementations provided in this disclosure of the present disclosure shall fall within the protection scope of this disclosure of the present disclosure.

What is claimed is:

1. A liquid leakage detection apparatus comprising:

a first liquid cooling pipe comprising a coolant and configured to dissipate heat of an electronic element using the coolant, wherein the coolant has a characteristic of conductivity;

a liquid cooling plate having an edge, wherein the liquid cooling plate is coupled to the first liquid cooling pipe and comprises a second liquid cooling pipe, and wherein the second liquid cooling pipe comprises the coolant;

a liquid leakage detection circuit configured to detect whether the liquid leakage detection apparatus has leaked;

flow guiding apparatuses coupled to the edge and the liquid leakage detection circuit and configured to guide first leaked liquid or second leaked liquid to the liquid leakage detection circuit when the first leaked liquid occurs in the first liquid cooling pipe or the second leaked liquid occurs in the liquid cooling plate; and a sleeve sleeved outside the first liquid cooling pipe and configured to form a gap between the sleeve and the first liquid cooling pipe to accommodate the first leaked liquid and guide the first leaked liquid to the flow guiding apparatuses.

2. The liquid leakage detection apparatus of claim 1, further comprising a joint between the first liquid cooling pipe and the liquid cooling plate, wherein the flow guiding apparatuses comprise a first flow guiding apparatus located below the joint and configured to guide the first leaked liquid to the liquid leakage detection circuit.

3. The liquid leakage detection apparatus of claim 2, wherein the liquid leakage detection circuit comprises a first conduction point and a second conduction point, wherein the first leaked liquid flows to the first conduction point through the first flow guiding apparatus and couples the first conduction point to the second conduction point to enable the liquid leakage detection circuit to learn that the first leaked liquid exists.

4. The liquid leakage detection apparatus of claim 1, wherein the liquid cooling plate further comprises:

a support;

an enclosure disposed on the support for liquid storage and comprising a liquid leakage outlet; and a water-holding pan formed using the enclosure and configured to:

accommodate the second leaked liquid; and enable the second leaked liquid to flow from the liquid leakage outlet to the liquid leakage detection circuit.

5. The liquid leakage detection apparatus of claim 3, wherein the flow guiding apparatuses comprise a second flow guiding apparatus disposed between the liquid cooling plate and the liquid leakage detection circuit and further at a liquid leakage outlet and configured to guide the second leaked liquid to the liquid leakage detection circuit.

6. The liquid leakage detection apparatus of claim 1, wherein an included angle between the flow guiding apparatuses and a horizontal plane is not 0 degrees.

7. The liquid leakage detection apparatus of claim 1, further comprising a printed circuit board (PCB), wherein the liquid leakage detection circuit and the electronic element are deployed on the PCB.

8. The liquid leakage detection apparatus of claim 1, wherein an included angle between the first liquid cooling pipe and the liquid cooling plate at a connection position is not 0 degrees.

9. The liquid leakage detection apparatus of claim 1, wherein the first liquid cooling pipe is further configured to dissipate heat of at least one of a central processing unit (CPU), an application-specific integrated circuit (ASIC), a programmable logic device (PLD), a field-programmable gate array (FPGA), or a generic array logic (GAL).

10. The liquid leakage detection apparatus of claim 1, wherein the liquid cooling plate is disposed above the electronic element and is in contact with the electronic element.

11. The liquid leakage detection apparatus of claim 1, wherein the liquid cooling plate and the first liquid cooling pipe are configured to form integrally.

12. A computer device comprising:

an electronic element configured to generate heat; and a liquid leakage detection apparatus coupled to the electronic element, configured to dissipate the heat, and comprising:

a first liquid cooling pipe comprising a coolant and configured to dissipate the heat using the coolant, wherein the coolant has a characteristic of conductivity;

a liquid cooling plate having an edge, wherein the liquid cooling plate is coupled to the first liquid cooling pipe and comprises a second liquid cooling pipe, and wherein the second liquid cooling pipe comprises the coolant;

a liquid leakage detection circuit configured to detect whether the liquid leakage detection apparatus has leaked;

flow guiding apparatuses coupled to the edge and the liquid leakage detection circuit and configured to guide first leaked liquid or second leaked liquid to the liquid leakage detection circuit when the first leaked liquid occurs in the first liquid cooling pipe or the second leaked liquid occurs in the liquid cooling plate; and a sleeve sleeved outside the first liquid cooling pipe and configured to form a gap between the sleeve and the first liquid cooling pipe to accommodate the first leaked liquid and guide the first leaked liquid to the flow guiding apparatuses.

13. The computer device of claim 12, wherein the liquid leakage detection apparatus further comprises a joint between the first liquid cooling pipe and the liquid cooling plate, and wherein the flow guiding apparatuses comprise a first flow guiding apparatus located below the joint and configured to guide the first leaked liquid to the liquid leakage detection circuit.

14. The computer device of claim 13, wherein the liquid leakage detection circuit comprises a first conduction point and a second conduction point, and wherein the first leaked liquid flows to the first conduction point through the first flow guiding apparatus and couples the first conduction point to the second conduction point to enable the liquid leakage detection circuit to learn that the first leaked liquid exists.

15. The computer device of claim 12, wherein the liquid cooling plate further comprises:

a support;

an enclosure disposed on the support for liquid storage and comprising a liquid leakage outlet; and a water-holding pan formed using the enclosure and configured to:

accommodate the second leaked liquid; and enable the second leaked liquid to flow from the liquid leakage outlet to the liquid leakage detection circuit.

16. The computer device of claim 12, wherein the flow guiding apparatuses comprise a second flow guiding apparatus disposed between the liquid cooling plate and the liquid leakage detection circuit and further at a liquid leakage outlet and configured to guide the second leaked liquid to the liquid leakage detection circuit.

17. The computer device of claim 12, wherein an included angle between the flow guiding apparatuses and a horizontal plane is not 0 degrees.

18. The computer device of claim 12, wherein the liquid leakage detection apparatus further comprises a printed circuit board (PCB), and wherein the liquid leakage detection circuit and the electronic element are deployed on the PCB.

19. The computer device of claim 12, wherein an included angle between the first liquid cooling pipe and the liquid cooling plate at a connection position is not 0 degrees.

20. A method implemented by a liquid cooling server, wherein the method comprises:

obtaining, using an analog to digital converter (ADC) of a liquid leakage detection circuit that includes first and second conduction points separated by an open circuit region, a first voltage between the ADC and a voltage drain drain (VDD) through a resistor;

obtaining, using the liquid leakage detection circuit, a liquid leakage occurrence signal when the first voltage is 0, wherein the first voltage becomes 0 when conductive coolant guided by flow guiding apparatuses coupled to an edge of a liquid cooling plate bridges the first and second conduction points; and performing a preset action based on the liquid leakage occurrence signal.

* * * * *